United States Patent
Sheng et al.

(10) Patent No.: US 12,405,107 B2
(45) Date of Patent: Sep. 2, 2025

(54) DATA ACQUISITION DEVICE, DATA CORRECTION METHOD AND APPARATUS, AND ELECTRONIC DEVICE

(71) Applicant: ALIBABA GROUP HOLDING LIMITED, Grand Cayman (KY)

(72) Inventors: Zhe Sheng, Hangzhou (CN); Zilong Dong, Hangzhou (CN); Ping Tan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 440 days.

(21) Appl. No.: 17/816,842

(22) Filed: Aug. 2, 2022

(65) Prior Publication Data
US 2023/0012240 A1    Jan. 12, 2023

Related U.S. Application Data

(63) Continuation of application No. PCT/CN2021/082315, filed on Mar. 23, 2021.

(30) Foreign Application Priority Data

Mar. 24, 2020   (CN) .......................... 202010214154.6

(51) Int. Cl.
*G01B 11/24*    (2006.01)
*G01S 7/497*    (2006.01)
*G01S 17/89*    (2020.01)

(52) U.S. Cl.
CPC .............. *G01B 11/24* (2013.01); *G01S 7/497* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 9,671,094 B2 * | 6/2017 | Ball | .................. G01S 17/42 |
| 2018/0052232 A1 | 2/2018 | Ohtomo et al. | |

FOREIGN PATENT DOCUMENTS

| | | |
|---|---|---|
| CN | 101008571 A | 8/2007 |
| CN | 102232176 A | 11/2011 |

(Continued)

OTHER PUBLICATIONS

Translation for JPH06147844A.*

(Continued)

*Primary Examiner* — Luke D Ratcliffe
(74) *Attorney, Agent, or Firm* — Finnegan, Henderson, Farabow, Garrett & Dunner, LLP

(57) ABSTRACT

Embodiments of the present disclosure disclose a data acquisition device, a data correction method and apparatus, and an electronic device. The data acquisition device includes: a rotation component, a first ranging component, and an image acquisition component. The rotation component is configured to drive the data acquisition device to rotate in a first direction. The first ranging component is configured to rotate in the first direction along with the data acquisition device, to rotate in a second direction, and to measure first ranging data. The first direction is different from the second direction. The image acquisition component is configured to rotate in the first direction along with the data acquisition device, and to acquire image data in a three-dimensional scene.

20 Claims, 7 Drawing Sheets

(56) References Cited

FOREIGN PATENT DOCUMENTS

| CN | 204679637 U | | 9/2015 | | |
|---|---|---|---|---|---|
| CN | 105067023 A | | 11/2015 | | |
| CN | 105445749 A | | 3/2016 | | |
| CN | 105928457 A | | 9/2016 | | |
| CN | 107376283 A | | 11/2017 | | |
| CN | 207557478 U | | 6/2018 | | |
| CN | 108267748 A | | 7/2018 | | |
| CN | 108603933 A | | 9/2018 | | |
| CN | 109633669 A | | 4/2019 | | |
| CN | 110196431 A | | 9/2019 | | |
| CN | 209625377 U | | 11/2019 | | |
| CN | 113566762 A | | 10/2021 | | |
| DE | 11 2016 006 213 T5 | | 10/2018 | | |
| JP | H06147844 A | * | 5/1994 | .............. | B60M 1/28 |
| WO | WO2021190485 | | 9/2021 | | |

OTHER PUBLICATIONS

PCT International Search Report and Written Opinion mailed Jun. 10, 2021, issued in corresponding International Application No. PCT/CN2021/082315 (14 pgs.).
First Office Action issued in corresponding Chinese Application No. 202010214154.6 on Dec. 7, 2022 (6 pages).
Chinese Search Report issued in corresponding Chinese Application No. 202010214154.6 on Apr. 21, 2023 (3 pages) not available.
European Patent Office Communication issued for Application No. 21774125.5 the Supplementary European Search Report (Art. 153(7) EPC) and the European search opinion dated Jul. 20, 2023, 7 pages.

* cited by examiner

DATA ACQUISITION DEVICE, DATA CORRECTION METHOD AND APPARATUS, AND ELECTRONIC DEVICE

CROSS-REFERENCE TO RELATED APPLICATIONS

The present application claims priority to International Application No. PCT/CN2021/082315, filed on Mar. 23, 2021, which claims priority to and the benefits of Chinese Patent Application Serial No. 202010214154.6, filed on Mar. 24, 2020, entitled "DATA ACQUISITION DEVICE, DATA CORRECTION METHOD AND APPARATUS, AND ELECTRONIC DEVICE," both of which are incorporated herein by reference in their entireties.

TECHNICAL FIELD

The present disclosure relates to the field of computer technologies, and in particular, to a data acquisition device, a data correction method and apparatus, and an electronic device.

BACKGROUND

Three-dimensional reconstruction technology is one of the research hotspots in the field of computer vision in industry and academia. According to different objects to be reconstructed, three-dimensional reconstruction may be divided into three-dimensional reconstruction of objects, three-dimensional reconstruction of scenes, three-dimensional reconstruction of human bodies, and the like. For three-dimensional reconstruction of scenes, a three-dimensional scene acquisition device in the related art usually uses a depth camera to acquire images and depth information of a surrounding environment. The three-dimensional scene acquisition device is equipped with three depth cameras, that is, horizontal-view, top-view, and bottom-view cameras, to acquire depth images and color images respectively. The bottom of the three-dimensional scene acquisition device is equipped with a rotating motor, so that the three-dimensional scene acquisition device can rotate in the horizontal direction, and capture scene images by the depth cameras during the rotation. In this manner, a plurality of color images and a plurality of depth images can be acquired at one acquisition point, and an actual distance of an object corresponding to a pixel can be obtained from a depth image. However, data acquired in this manner has a relatively large depth error, and the depth range is limited and thus is not suitable for relatively open scenes such as outdoor.

SUMMARY

Embodiments of the present disclosure provide a data acquisition device. The data acquisition device includes: a rotation component configured to drive the data acquisition device to rotate in a first direction; a first ranging component configured to rotate in the first direction along with the data acquisition device, rotate in a second direction, and measure first ranging data, the first direction being different from the second direction; and an image acquisition component configured to rotate in the first direction along with the data acquisition device and to acquire image data in a three-dimensional scene.

Embodiments of the present disclosure provide a data correction apparatus. The data correction apparatus includes a first obtaining component, configured to obtain first ranging data and second ranging data, in which the first ranging data and the second ranging data are respectively acquired by a first ranging component and a second ranging component on a data acquisition device; a second obtaining component, configured to obtain first point cloud data according to the second ranging data, in which the first point cloud data includes three-dimensional spatial coordinates of a target point on an object surface corresponding to the second ranging data; an extraction component, configured to obtain second point cloud data corresponding to the target point from the omnidirectional point cloud data; and a determining component, configured to determine error data according to the first point cloud data and the second point cloud data, and correct the omnidirectional point cloud data according to the error data.

Embodiments of the present disclosure provide a data correction method. The data correction method includes: obtaining first ranging data and second ranging data, in which the first ranging data and the second ranging data are respectively acquired by the first ranging component and the second ranging component on a data acquisition device; obtaining first point cloud data according to the second ranging data, in which the first point cloud data includes three-dimensional spatial coordinates of a target point on an object surface corresponding to the second ranging data; obtaining second point cloud data corresponding to the target point from the omnidirectional point cloud data; and determining error data according to the first point cloud data and the second point cloud data, and correcting the omnidirectional point cloud data according to the error data.

Embodiments of the present disclosure provide an electronic device. The electronic device includes: a memory configured to store one or more computer instructions; and one or more processors, in which the one or more computer instructions are executed by the one or more processors to cause the electron device to perform the data correction method mentioned above.

Embodiments of the present disclosure provide a non-transitory computer-readable storage medium that stores one or more programs executable by one or more processors to perform the data correction method mentioned above.

It should be understood that the above general descriptions and the following detailed descriptions are merely for exemplary and explanatory purposes, and do not limit the present disclosure.

BRIEF DESCRIPTION OF THE DRAWINGS

Other features, purposes, and advantages of the present disclosure become more apparent in view of the following detailed descriptions of non-limiting implementations with reference to the accompanying drawings.

DETAILED DESCRIPTION

Exemplary implementations of the present disclosure are described in detail below with reference to the accompanying drawings, so that a person skilled in the art can easily implement the implementations. In addition, parts unrelated to the description of the exemplary implementations are omitted from the accompanying drawings for clarity.

In the present disclosure, it should be understood that, terms such as "including" or "having" are intended to indicate the presence of features, numbers, steps, acts, components, parts, or combinations thereof disclosed in this specification, and are not intended to exclude the possibility that one or more other features, numbers, steps, acts, components, parts, or combinations thereof exist or are added.

In addition, it should be further noted that, the embodiments in the present disclosure and features in the embodiments may be mutually combined in case that no conflict occurs. The present disclosure is described in detail below with reference to the accompanying drawings and the embodiments.

The technical solutions provided in the embodiments of the present disclosure may include following beneficial effects. In particular, the data acquisition device in the embodiments of the present disclosure uses the first ranging component to measure depth information in the three-dimensional scene, that is, data of a distance between the first ranging component and the object surface in the three-dimensional scene. Since the first ranging component may be selected from products such as laser radars that can cover various measuring ranges and have high precision, and errors of laser radars are relatively small, a single acquisition point covers a relatively wide area. In a relatively open environment, a quantity of acquisition points can be reduced, which can reduce the costs. In addition, the data acquisition device in the embodiments of the present disclosure can further acquire, through the image acquisition component, a plurality of pieces of image data that can be stitched to form a panoramic image. In the embodiments of the present disclosure, since the first ranging component can rotate for a plurality of cycles in the second direction in the process of rotating for one cycle in the first direction, the first ranging data covering the omnidirectional object surface in the three-dimensional scene can be finally acquired. Therefore, the data acquisition device in the embodiments of the present disclosure can acquire three-dimensional scene data with higher precision and wider coverage at a lower cost.

Figure 1:
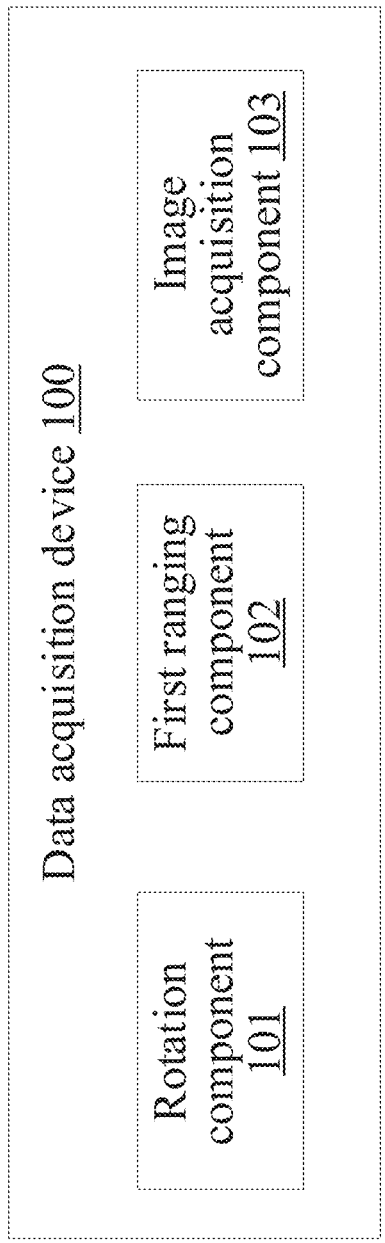
FIG. 1 is a schematic structural diagram of a data acquisition device according to some embodiments of the present disclosure.

FIG. 1 is a schematic structural diagram of a data acquisition device 100 according to some embodiments of the present disclosure. As shown in FIG. 1, the data acquisition device 100 includes a rotation component 101, a first ranging component 102, and an image acquisition component 103. The rotation component 101 is configured to drive the data acquisition device 100 to rotate in a first direction. The first ranging component 102 is configured to rotate in the first direction along with the data acquisition device 100, is further configured to rotate in a second direction, and is further configured to measure first ranging data, the first direction being different from the second direction. The image acquisition component 103 is configured to rotate in the first direction along with the data acquisition device 100, and is further configured to acquire image data in a three-dimensional scene.

In this example, the rotation component 101 may be a tripod head. The tripod head may be a horizontal tripod head, which is configured to support the data acquisition device 100 and drive the data acquisition device 100 to rotate in the first direction. When the data acquisition device 100 is placed horizontally, the first direction is parallel to the ground plane.

The first ranging component 102 may rotate in the second direction, and continuously acquire distance data in the three-dimensional scene during the rotation in the second direction. The first direction and the second direction may be different. In the process of the rotation component 101 driving the data acquisition device to rotate in the first direction, the first ranging component 102 rotates in the second direction to measure the first ranging data. Therefore, the first ranging data may include data of a distance between an object surface and the first ranging component 102. The object surface is scanned in the first direction by a second plane formed by the rotation of the first ranging component 102 in the second direction.

In some embodiments, the first direction and the second direction may be perpendicular to each other. In some other embodiments, when the data acquisition device 100 is placed horizontally, the first direction may be parallel to the ground plane, and the second direction may be perpendicular to the ground plane.

In some embodiments, a rotation axis of the first ranging component 102 in the second direction may be perpendicular to a rotation axis of the rotation component 101 in the first direction.

In some embodiments, the first ranging component 102 may be a laser ranging component. The first ranging component 102 may rotate by using a brushless motor. The first ranging component 102 can include a laser transmitter and a laser receiver. In addition, in the process of the first ranging component 102 being driven by the brushless motor to rotate in the second direction, the laser transmitter and the laser receiver rotate together, and the laser transmitter and the laser receiver rotate on the same plane. The laser transmitter may be a single-point laser transmitter, so that a direction of a laser beam emitted by the laser transmitter may be perpendicular to the rotation axis of the first ranging component 102. In addition, during rotation in the second direction, a laser plane formed by the laser beam may be parallel to the rotation axis of the rotation component 101. That is, in the process of the first ranging component 102 rotating in the second direction for one cycle, the laser plane formed by the laser beam emitted by the laser transmitter is perpendicular to a first plane formed by the rotation component driving the data acquisition device to rotate in the first direction.

During the rotation of the first ranging component 102, the laser transmitter continuously emits laser beams from a laser receiving hole, and the laser beams are received by the laser receiver in the laser receiving hole after being reflected by the object surface. In some embodiments, the first ranging component 102 may calculate a physical distance between the first ranging component 102 and a reflection point on the object surface according to a time difference between the emitted laser beam and the laser beam received after being emitted. Certainly, in some other embodiments, the physical distance between the first ranging component 102 and a reflection point on the object surface may be alternatively calculated by using a trigonometric method, a phase method, or the like, which may be specifically determined according to the actual application and is not limited herein.

It may be understood that the foregoing first ranging component may be another ranging component, such as an ultrasonic ranging component or the like.

After the first ranging component 102 rotates in the second direction for one cycle, a set of first ranging data can be acquired. The set of first ranging data includes data of distances from a plurality of laser reflection points on an intersecting curve of a vertical rotation plane formed by the laser beam emitted by the first ranging component 102 and the surrounding object surface to the first ranging component 102. A rotation speed of the first ranging component 102 in the second direction is much greater than a rotation speed of the rotation component 101 in the first direction. Therefore, in the process of the rotation component 101 driving the data acquisition device 100 to rotate in the first direction for one cycle, the first ranging component 102 may rotate for a plurality of cycles in the second direction, and may acquire a plurality of sets of first ranging data at a plurality of horizontal rotation angles. The plurality of sets of first ranging data may cover the omnidirectional object surface in the three-dimensional scene.

In some embodiments, to reduce costs, the first ranging component 102 may be selected from a single-line laser ranging radar, such as a rotary triangulation single-line laser radar, a phase-method single-line laser radar, a ToF single-line laser radar, etc. Certainly, it is understood that the first ranging component 102 may be alternatively selected from a multi-line laser radar, for example, a ToF multi-line laser radar. A laser ranging radar determines a distance between a measured object and a test point on the laser ranging radar by emitting a laser beam to the measured object and receiving a reflected wave of the laser beam. The distance calculation using the laser ranging radar generally includes three methods: a time-of-flight (TOF) calculation, a triangulation calculation, and a phase method calculation. The time-of-flight calculation is to calculate a distance by recording a time difference between an emitted light and a reflected light. A laser ranging radar using the time-of-flight calculation is referred to as a ToF laser radar. The triangulation calculation is to calculate a distance according to a triangle pixel deviation of a reflected light. A laser ranging radar using the triangulation calculation is referred to as a triangulation laser radar. The phase method calculation is to calculate a distance according to a phase difference between an emitted light and a reflected light. A laser ranging radar using the phase method calculation is referred to as a phase-based laser radar. A single-line laser radar acquires a single-line distance of an object surface in 360-degree direction by placing a laser ranging apparatus on a rotating motor and rotating continuously. A multi-line laser radar acquires multi-line distances of an object surface simultaneously by placing a plurality of laser ranging apparatuses on a rotating motor.

The image acquisition component 103 may be a camera, or the like. In some embodiments, the image acquisition component 103 may be a camera with a wide-angle lens. In the process of the rotation component 101 driving the data acquisition device 100 to rotate in the first direction for one cycle, the image data may be acquired by the image acquisition component 103.

The data acquisition device in the embodiments of the present disclosure uses the first ranging component to measure depth information in the three-dimensional scene, that is, data of a distance between the first ranging component and the object surface in the three-dimensional scene. Since the first ranging component may be selected from products such as laser radars that can cover various ranges with high precision, and errors of laser radars are relatively small, a single acquisition point covers a relatively wide area. In a relatively open environment, the quantity of acquisition points can be reduced, which can reduce the costs. In addition, the data acquisition device in the embodiments of the present disclosure can further acquire, through the image acquisition component, a plurality of pieces of image data that can be stitched to form the panoramic image. In the embodiments of the present disclosure, since the first ranging component can rotate for a plurality of cycles in the second direction in the process of rotating for one cycle in the first direction, the first ranging data covering the omnidirectional object surface in the three-dimensional scene can be finally acquired. Therefore, the data acquisition device in the embodiments of the present disclosure can acquire three-dimensional scene data with higher precision and wider coverage at a lower cost.

In an optional implementation of this example, the data acquisition device 100 further includes a second ranging component. The second ranging component may be a high-precision ranging component, and may be configured to obtain second ranging data in the three-dimensional scene. The high-precision ranging component may be a ranging component with a millimeter-level ranging error, while a ranging error of the first ranging component may be centimeter-level. Therefore, the ranging error of the second ranging component is less than the ranging error of the first ranging component.

In some embodiments, the first ranging component and the second ranging component may both be laser ranging components.

In some embodiments, to reduce costs, the first ranging component 102 may be selected from a single-line laser ranging radar. The single-line laser radar has certain measurement errors. For example, an error of the common triangulation single-line laser radar is about ±1% to 2% of the measurement distance, while an error of the ToF single-line laser radar is about ±3 cm and unrelated to the distance. Therefore, if precision requirements of depth information in the three-dimensional scene data are high in an actual application scenario, a second ranging component, that is, a high-precision laser ranging module, may be arranged on a three-dimensional laser acquisition device. A ranging error of the second ranging component may be less than the ranging error of the first ranging component 102. In a data acquisition process, while the first ranging component 102 is used to obtain a plurality of sets of first ranging data, the second ranging component may also be used to obtain second ranging data. Since the plurality of sets of first ranging data may cover the object surface in the three-dimensional scene in all directions, and the objective of the second ranging data acquired by the second ranging component is to correct the first ranging data, the second ranging component only needs to measure a part of the object surface. In a measurement error correction process, first ranging data of the same part of an object surface measured by the second ranging data may be extracted from the first ranging data, the first ranging data of this part is compared with the second ranging data to determine a measurement error, and all the first ranging data is then corrected according to the measurement error.

In some embodiments, laser wavelengths used by the first ranging component 102 and the second ranging component may be different. For example, the first ranging component 102 may use infrared light, and the second ranging component may use visible light. In this way, laser beams emitted by the first ranging component 102 and the second ranging component do not affect each other.

For example, assuming that a distance between the first ranging component 102 and a point A on the object surface in the first ranging data is r1, and a distance between the second ranging component and the point A on the object surface in the second ranging data is r2. The distance r1 can be processed to determine that three-dimensional spatial coordinates of the point A in the three-dimensional scene is B1, and the distance r2 can be processed to determine that three-dimensional spatial coordinates of the point A in the three-dimensional scene is B2. In this case, three-dimensional spatial coordinates B1 and B2 may be compared to determine error data of B1 relative to B2. The precision of the second ranging component is higher, so that data obtained by the second ranging component is used as correct data to determine the error data.

The above is merely an example. In an actual application scenario, the error data may be calculated by comprehensively considering the distance data of a group of points on the object surface, which may be determined according to the actual situation and is not limited herein.

In an optional implementation of this example, in a process of the rotation component 101 driving the data acquisition device 100 to rotate for one cycle in the first direction, the second ranging component rotates in the first direction to measure the second ranging data.

In an optional implementation of this example, the rotation component 101 is arranged below the data acquisition device 100. The first ranging component 102 is arranged on a first side of the data acquisition device 100. The second ranging component is arranged on a second side of the data acquisition device 100. A plane on which the first side is located intersects with a plane on which the second side is located. For example, the two planes may be perpendicular to each other. A lens direction of the image acquisition component is opposite to a direction in which the second ranging component emits a laser beam.

In this optional implementation, the rotation component 101 may be arranged at the bottom of the data acquisition device 100 to support the entire data acquisition device 100. When rotating around the rotation axis, the rotation component 101 may drive the entire data acquisition device 100 to rotate. The first ranging component 102 may be arranged on the first side, and the second ranging component may be arranged on the second side intersecting with the plane on which the first side is located. A direction of a laser beam emitted by the second ranging component may be parallel to a scanning plane of a laser beam emitted by the first ranging component 102. As the data acquisition device 100 rotates in the first direction, the scanning plane of the laser beam emitted by the second ranging component is parallel to the ground plane.

In some embodiments, an angle between the direction of the laser beam emitted by the second ranging component and the scanning plane of the laser beam emitted by the first ranging component 102 may be set to be relatively large. For example, when the angle is close to 90 degrees, even if the laser wavelengths used by the first ranging component 102 and the second ranging component are the same or similar, the laser beams emitted by the first ranging component 102 and the second ranging component do not affect each other.

In addition, since the rotation component 101 is located at the bottom of the data acquisition device 100, the laser beams emitted by the first ranging component 102 and the second ranging component are not blocked during the rotation of the rotation component 101 and the rotation of the first ranging component 102. The image acquisition component 103 may be arranged above the data acquisition device 100, and the lens direction in which the image acquisition component 103 acquires images may be opposite to the direction in which the second ranging component emits a laser beam. For example, when the image acquisition component 103 acquires image data from a horizontal-view angle, a direction for acquiring images is opposite to a direction in which the second ranging component acquires distance data.

Figure 2:
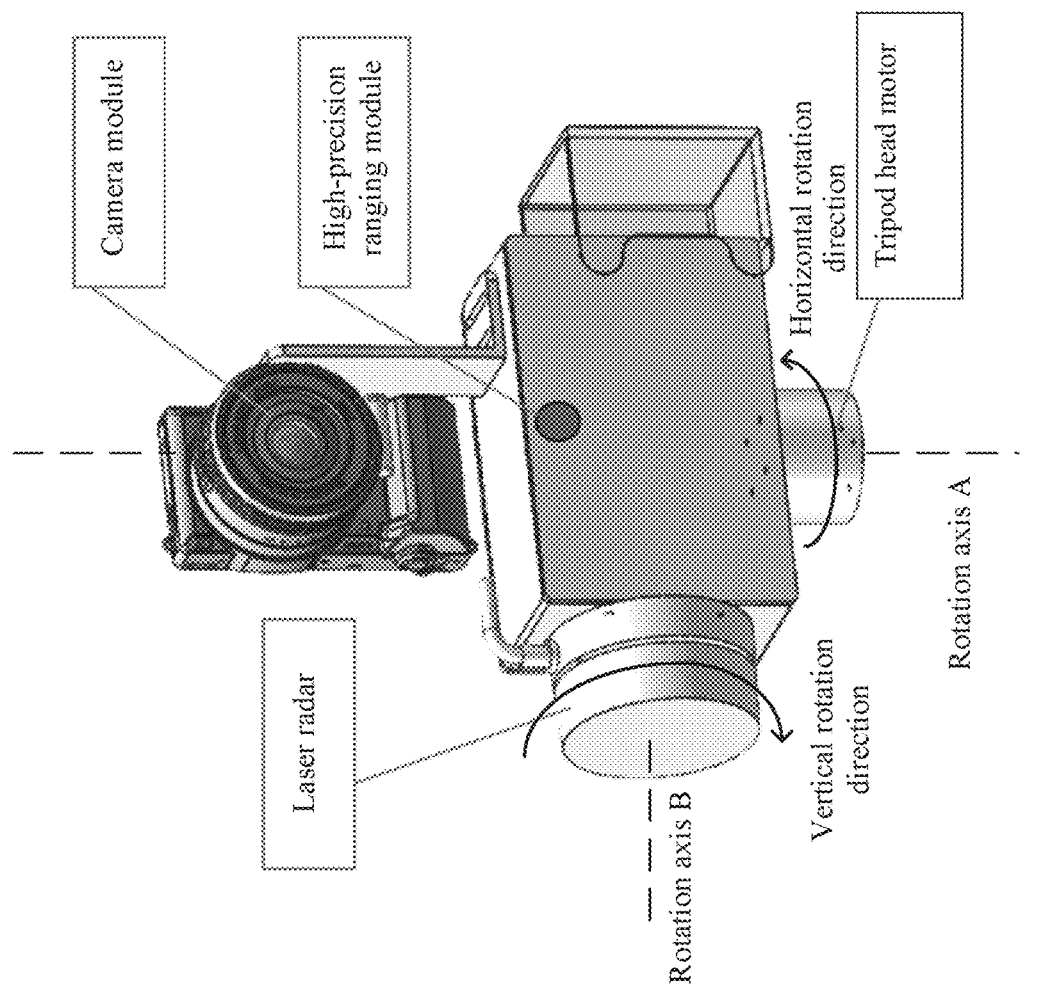
FIG. 2 is a schematic structural diagram of a data acquisition device according to some embodiments of the present disclosure.

FIG. 2 is a schematic structural diagram of a data acquisition device according to some embodiments of the present disclosure. As shown in FIG. 2, the data acquisition device is equipped with a laser radar, a camera module, a high-precision ranging component, and a tripod head motor. The tripod head motor is arranged at the bottom of the data acquisition device, and can support the data acquisition device and drive the data acquisition device to rotate around a rotation axis A in a first direction. The laser radar may be arranged on a cylindrical brushless motor. A bottom plane of the brushless motor may be arranged adjacent to a side (e.g., the left side in FIG. 2) of the data acquisition device. The body of the laser radar may also be cylindrical. A laser emitting hole and a laser receiving hole (being covered and not shown in the figure) are arranged on the cylindrical side of the laser radar. A laser transmitter is arranged in the laser emitting hole, and may emit a laser beam in a second direction through the laser emitting hole. After being reflected by an object surface, the laser beam enters the laser receiving hole and is received by a laser receiver arranged in the laser receiving hole. The laser radar may rotate around a rotation axis B in the second direction. The camera module is mounted above the data acquisition device through a bracket. A lens direction of the camera module may be the first direction, that is, the camera module acquires images from a horizontal-view angle. The camera module may use a wide-angle lens to acquire a plurality of images, which may be stitched into a panoramic image. The high-precision laser ranging module is arranged on the other side (being covered and not shown in the figure, in which the figure shows the arranged position of the high-precision laser ranging module on the back) of the data acquisition device. The high-precision laser ranging module emits a laser beam in the first direction, and the emission direction is opposite to the lens direction of the camera module. That is, the laser emission direction of the high-precision laser ranging module is an inward direction in the figure.

In an optional implementation of this example, a lens center of the image acquisition component 103 is located on a line extending from a rotation axis of the rotation component 101. The lens center of the image acquisition component 103 is arranged on the line extending from the rotation axis of the rotation component 101, so that there is no parallax between a plurality of images acquired by the image acquisition component 103 at a plurality of preset rotation angles, and a panoramic image obtained by stitching the plurality of images achieves a better panoramic effect.

In an optional implementation of this example, the image acquisition component 103 acquires the image data after rotating to a preset rotation angle in the first direction.

The image acquisition component 103 may acquire a plurality of images, and the plurality of images may be stitched to form a panoramic image. Therefore, in the process of the rotation component 101 driving the data acquisition device 100 to rotate in the first direction, the image acquisition component 103 acquires the image data after rotating to the preset rotation angle. There may be a plurality of preset rotation angles. For example, there may be six preset rotation angles spaced 60 degrees apart. That is, the six preset rotation angles are 0 degrees, 60 degrees, 120 degrees, 180 degrees, 240 degrees, and 300 degrees. Certainly, it can be understood that the preset rotation angle may be determined according to the actual hardware devices and actual requirements of the image acquisition component 103. For example, when a panoramic image is required, it is only necessary to acquire a plurality of images that can be stitched to form the panoramic image.

In an optional implementation of this example, the data acquisition device 100 further includes a micro control unit and a main control unit. The micro control unit may be a single-chip microcomputer, or the like. A real-time system may run on the micro control unit. The micro control unit is connected to various sensors on the data acquisition device, and is configured to obtain data on the various sensors arranged on the data acquisition device 100 in real time, to add time-stamp and perform time-synchronization to the obtained data, and then send the data to the main control unit for processing. The sensors arranged on the data acquisition device 100 include, but are not limited to, a first ranging component 102, a second ranging component, an inertial measurement unit (IMU), and the like. The micro control unit is further connected to the rotation component 101, and may control the rotation component 101 and obtain a rotation angle and the like from the rotation motor of the rotation component 101.

The main control unit is connected to the image acquisition component, and is configured to acquire image data from the image acquisition component 103, receive data of the sensors from the micro control unit, and then perform corresponding processing on the data of the sensors. The main control unit may be a processing unit such as a CPU, and is configured to run a non-real-time operating system such as Linux.

Figure 3:
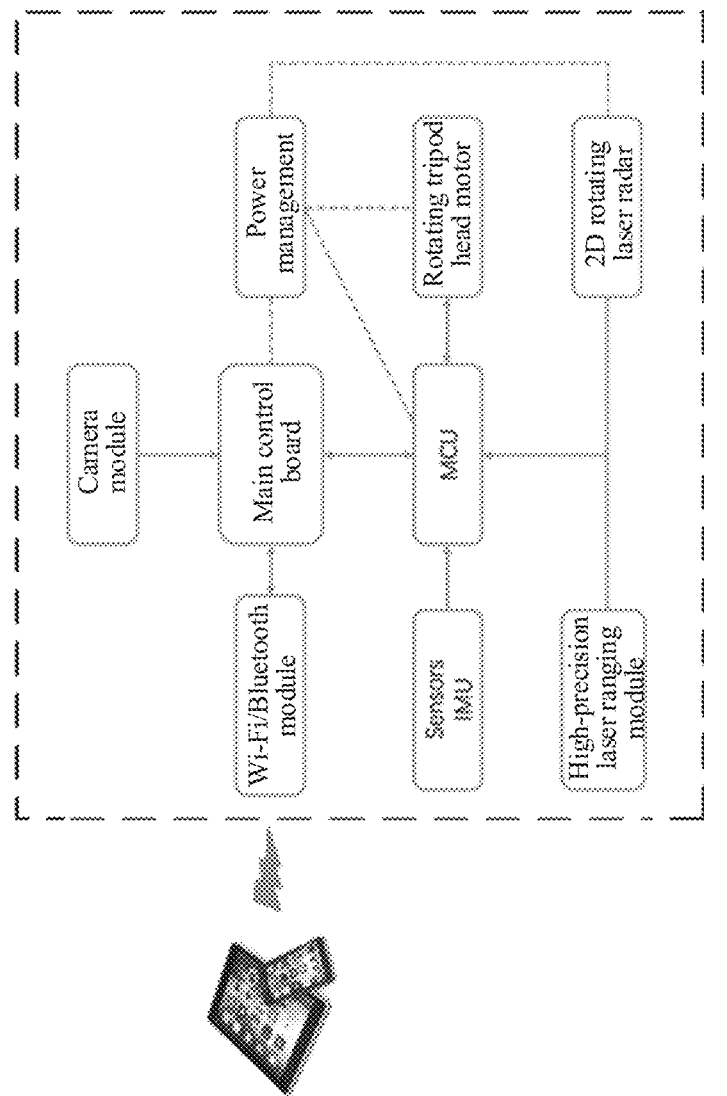
FIG. 3 is a schematic diagram of a circuit design of a data acquisition device according to some embodiments of the present disclosure.

FIG. 3 is a schematic diagram of a circuit design of a data acquisition device according to some embodiments of the present disclosure. In some embodiments, the data acquisition device may be a three-dimensional (3D) acquisition device. As shown in FIG. 3, in the circuit design of the data acquisition device, the micro control unit MCU is equipped with a serial port, a motor drive interface, a laser radar drive interface, an IMU interface, and the like. The main control unit is equipped with a camera interface, a Wi-Fi and/or Bluetooth configuration interface, and the like. The micro control unit MCU is connected to the tripod head motor through the motor drive interface, connected to the laser radar and the high-precision laser ranging module through the laser radar drive interface, connected to the inertial measurement unit through the IMU interface, and connected to the main control unit through the serial port. The main control unit is connected to the camera module through the camera interface, configures a Wi-Fi/Bluetooth device through the Wi-Fi/Bluetooth configuration interface, and communicates with an external device such as ipad/mobile phone through the interface. The circuit design of the data acquisition device further includes a power management component configured to provide power to each component in the data acquisition device. The IMU may measure 3-axis acceleration and 3-axis angular velocity of the data acquisition device. Through the measured acceleration and angular velocity, an angle of the data acquisition device relative to the ground plane may be calculated, which can be used in three-dimensional scene modeling.

In an optional implementation of this example, the main control unit obtains omnidirectional point cloud data in the three-dimensional scene by processing a plurality of sets of the first ranging data. The omnidirectional point cloud data includes three-dimensional spatial coordinates of a measured point on an object surface in the three-dimensional scene. The plurality of sets of the first ranging data include data acquired by the first ranging component 102 by rotating for one cycle in the first direction along with the data acquisition device 100 and rotating for a plurality of cycles in the second direction.

In this optional implementation, in the process of the data acquisition device 100 rotating for one cycle in the first direction, the first ranging component 102 rotates for a plurality of cycles in the second direction, and the first ranging component 102 is capable of measuring distances of tens of thousands of points per second. Therefore, a set of first ranging data may be acquired through rotation for each cycle, and a plurality of sets of first ranging data may be obtained through continuous rotation for a plurality of cycles. The set of first ranging data includes distance data of a measured point on the object surface that is obtained by scanning a three-dimensional scene for one cycle on a vertical plane by using a laser. The plurality of sets of first ranging data acquired after the data acquisition device 100 rotates for one cycle in the first direction include distance data of the measured point on an omnidirectional object surface in the three-dimensional scene.

The distance data of the measured point on the omnidirectional object surface in the three-dimensional scene is a physical distance between a test point (e.g., a laser emission point) on the first ranging component 102 and the measured point on the object surface. In addition, in the acquisition process, a rotation angle of the first ranging component 102 in the second direction and a rotation angle of the rotation component 101 in the first direction are further recorded in real time during each acquisition. Therefore, after the distance data is determined, three-dimensional spatial coordinates of each point in the three-dimensional spatial coordinate system can be calculated through the rotation angles and the distance data.

After three-dimensional spatial coordinates of a plurality of measured points in the plurality of sets of first ranging data covering the omnidirectional object surface in the three-dimensional scene are determined according to the foregoing method, an omnidirectional laser point cloud can be constructed by calibrating the plurality of measured points in three-dimensional space. The omnidirectional point cloud data includes depth information in the three-dimensional scene.

Figure 4:
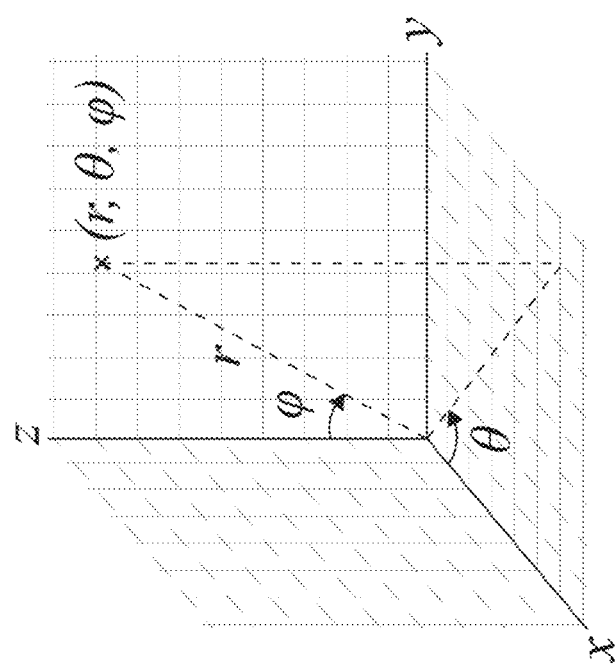
FIG. 4 is a schematic diagram of coordinates of a measured point in a three-dimensional spatial coordinate system in point cloud data according to some embodiments of the present disclosure.

FIG. 4 is a schematic diagram of coordinates of a measured point in point cloud data in a three-dimensional spatial coordinate system according to some embodiments of the present disclosure. As shown in FIG. 4, the three-dimensional spatial coordinates of the measured point may be determined as follows:

$$\begin{cases} x = r_{xy}\cos\theta_2 - d_x\sin\theta_2 \\ y = r_{xy}\sin\theta_2 + d_x\cos\theta_2 \\ z = r\cos\varphi_1 + d_z + d_L\sin\varphi_1 \end{cases}$$

where

-continued $$\varphi_1 = \varphi + \varphi_p$$

$$\theta_1 = \begin{cases} \theta + \theta_L, \varphi_1 \in [0, \pi) \\ \theta - \theta_L, \varphi_1 \in [\pi, 2\pi) \end{cases}$$

$$r_{xy} = r\sin\varphi_1 - d_L\cos\varphi_1$$

$$\theta_2 = \theta_1 + \theta_C$$

where x, y, and z denote coordinates of a target point in the three coordinate directions in the three-dimensional space, r denotes a distance between the target point and the first ranging component 102, θ denotes a horizontal rotation angle of the rotation component 101 in the first direction when r is measured, that is, a horizontal rotation angle of the first ranging component 102 in the first direction, denotes a distance between a center point of the first ranging component 102 and a rotation axis of the rotation component 101, $d_z$ denotes a vertical height difference between the center point of the first ranging component 102 and a center point of the lens of the image acquisition component 103, $d_L$ denotes a distance between the laser emission point of the first ranging component 102 and the rotation axis of the first ranging component 102 rotating in the second direction, φ denotes a vertical rotation angle of the first ranging component 102 in the second direction when r is measured, $\varphi_p$ denotes a pitch angle of the first ranging component 102 relative to a global coordinate system, $\theta_c$ denotes a yaw angle of the first ranging component 102 relative to the global coordinate system, and $\theta_L$ denotes a pitch angle of a laser beam emitted by the first ranging component 102 relative to a rotation axis of the first ranging component 102 rotating in the second direction.

The global coordinate system may be a geodetic coordinate system, that is, a three-dimensional spatial coordinate system with the ground plane as an XY plane. The rotation axis of the first ranging component 102 in the first direction is theoretically strictly parallel to the ground plane. However, due to device assembly or other reasons, there is a certain degree of error between the rotation axis relative to the ground plane. Therefore, the pitch angle $\varphi_p$ and the yaw angle $\theta_c$ need to be pre-calibrated. The pitch angle $\varphi_p$ of the first ranging component 102 is relative to the global coordinate system, and is an angle between the laser beam emitted by the first ranging component 102 and the rotation axis of the first ranging component 102 in the second direction minus 90 degrees. The yaw angle $\theta_c$ of the first ranging component 102 is relative to the global coordinate system, and is an assembly inclination angle of the rotation axis of the first ranging component 102 in the second direction relative to the vertical plane in the global coordinate system. In addition, theoretically, the laser beam emitted by the first ranging component 102 may be strictly perpendicular to the horizontal plane in the global coordinate system, that is, the ground plane. Further, since the rotation axis of the rotation component 101 is also perpendicular to the ground plane, theoretically, the direction of the laser beam emitted by the first ranging component 102 is perpendicular to the rotation axis of the first ranging component 102 in the second direction. However, due to device assembly or other reasons, the laser beam emitted by the first ranging component 102 may not be strictly perpendicular to the rotation axis. Therefore, the pitch angle $\theta_L$ (i.e., an angle between the laser beam and the rotation axis minus 90 degrees) of the laser beam emitted by the first ranging component 102 relative to the rotation axis needs to be pre-calibrated.

In an optional implementation of this example, the main control unit further performs error correction on the omnidirectional point cloud data by using the second ranging data. An error correction manner is as follows.

First, the main control unit obtains first point cloud data according to the second ranging data, the first point cloud data including three-dimensional spatial coordinates of a target point on an object surface corresponding to the second ranging data. The main control unit also obtains second point cloud data corresponding to the target point from the omnidirectional point cloud data.

Then, the main control unit determines error data according to the first point cloud data and the second point cloud data, and corrects the omnidirectional point cloud data according to the error data.

In this optional implementation, in the process of the data acquisition device 100 rotating for one cycle in the first direction, the second ranging component continuously emits laser beams, and then receives the laser beams reflected by the object surface in the three-dimensional scene, to calculate data of a distance between a point on the object surface to the second ranging component. After the second ranging component rotates for one cycle in the first direction along with the data acquisition device, a set of second ranging data may be measured. The set of second ranging data may include distance data of points on the object surface that is obtained by scanning the three-dimensional scene for one cycle on a horizontal rotation plane by the laser beam emitted by the second ranging component. The points may be referred to as target points. Three-dimensional spatial coordinates of the target points in the global coordinate system may be determined according to the set of second ranging data, and the three-dimensional spatial coordinates may constitute the first point cloud data.

As described above, omnidirectional laser ranging data obtained according to the plurality of sets of first ranging data covers the points on the object surface in the three-dimensional scene in all directions. Therefore, the second point cloud data corresponding to the target points may be extracted from the omnidirectional laser ranging data. That is, the three-dimensional spatial coordinates of the target points are extracted from the omnidirectional laser ranging data to form the second point cloud data.

Since both the first point cloud data and the second point cloud data correspond to the same target points, and the second point cloud data is obtained by the second ranging component with higher precision, the second point cloud data has higher precision. Therefore, the second point cloud data may be used as reference data to calculate an error between the two data. After the error between the first point cloud data and the second point cloud data is calculated, the omnidirectional point cloud data may be corrected by using the error, to increase the precision of the omnidirectional point cloud data. In this way, the high-precision laser ranging module may be used to complement the single-line laser radar to realize high-precision point cloud data with a low-cost solution.

In an optional implementation of this example, the main control unit further processes the image data to obtain a corresponding panoramic image.

In the process of the data acquisition device 100 rotating for one cycle in the first direction, the image acquisition component 103 may acquire a plurality of images, for example, six images, in which an acquisition angle in the first direction between the images is 60 degrees. The main control unit may stitch a plurality of color images after de-distortion at each viewing angle, to form a low-resolution panoramic image with preserved boundaries, so that an acquisition user can confirm whether an acquisition task is completed when acquiring data. For the stitching manner of the panoramic image, stitching algorithms are well known and details are not described herein for brevity.

In an optional implementation of this example, the main control unit further processes the omnidirectional point cloud data and the image data, to obtain a three-dimensional scene model.

The main control unit may perform a series of three-dimensional scene modeling processing on the omnidirectional point cloud data and the plurality of images acquired by the image acquisition component 103, to obtain the three-dimensional scene model. The three-dimensional scene model may be used by the acquisition user to confirm whether an acquisition task is completed when acquiring data. For the three-dimensional scene modeling processing manner, this type of processing is well known and details are not described herein for brevity.

When the three-dimensional scene has a relatively large area, data acquisition may be performed at a plurality of acquisition points. The data acquisition device 100 may store acquired data locally, and upload the acquired data to the cloud after the data acquisition of the plurality of acquisition points is completed. The cloud integrates the data acquired from the plurality of acquisition points, and uses a more refined algorithm to obtain a complete three-dimensional scene model.

Figure 5:
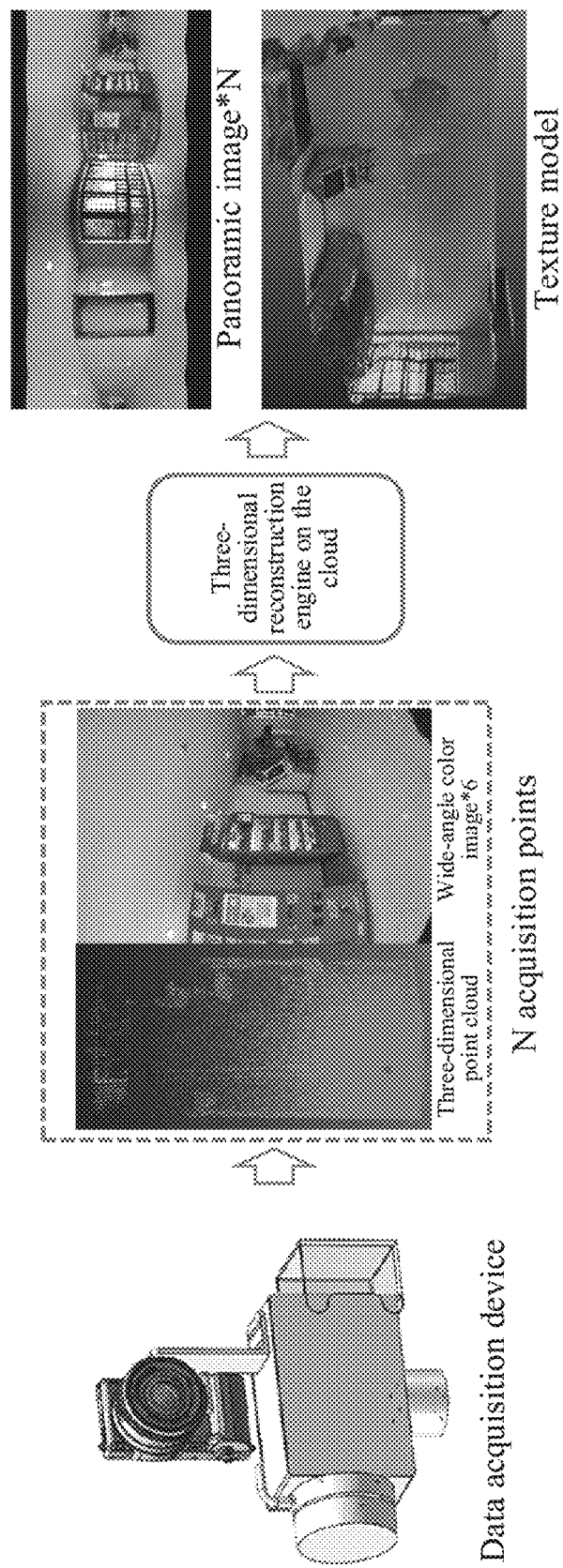
FIG. 5 is a schematic diagram of a process of using a data acquisition device to acquire data and reconstruct a three-dimensional scene according to some embodiments of the present disclosure.

FIG. 5 is a schematic diagram of a process of using a data acquisition device to acquire data and reconstruct a three-dimensional scene according to some embodiments of the present disclosure. As shown in FIG. 5, data on N acquisition points can be acquired by the data acquisition device. The data acquired on each acquisition point may include a piece of omnidirectional three-dimensional point cloud data and six color images. After being transmitted to the cloud through a network, such data may be processed by a three-dimensional reconstruction engine on the cloud, to obtain N panoramic images and a texture model. The texture model and the N panoramic images may be published on the web-end for users to perform virtual reality touring, for example, VR house viewing. The embodiments of the present disclosure may be applied to various scenarios, for example, a home decoration scenario. In a home decoration application scenario, the data acquisition device of the embodiments of the present disclosure may be used to acquire data in a room to be decorated, and perform three-dimensional reconstruction to the room to be decorated based on the acquired data, to obtain a texture model and a panoramic image of the room to be decorated. The texture model and the panoramic image may be sent to the relevant home decoration personnel in the current home decoration process, such as a home decoration designer or a furniture designer. The home decoration personnel may formulate a decoration plan, a furniture design plan, and the like for the room to be decorated according to the texture model and panoramic images, which can speed up the entire home decoration process and save home decoration costs.

In some embodiments, the process of acquiring data by the data acquisition device may be as follows.

In the first step, the data acquisition device is placed on a tripod and at an acquisition point, and a power supply of the device is opened. A control terminal may be connected to the data acquisition device through Wi-Fi/Bluetooth, and open control software on the data acquisition device, to create a new acquisition project and start an acquisition process. In the second step, after receiving an acquisition start instruction, the data acquisition device starts to rotate and acquire data in the three-dimensional scene, until the data acquisition device completes the acquisition at the current acquisition point. In the third step, if it is prompted that the acquisition is successful, the data acquisition device may be moved to the next acquisition point, and the second step is repeated. If it is prompted that the acquisition fails, indicating that the acquired data is incomplete or fails to match the existing map, it is recommended to adjust the position and perform the acquisition again. In the fourth step, after all data is acquired, the data is uploaded to the cloud, and the cloud performs three-dimensional reconstruction of the scene.

The process of acquiring data by the data acquisition device in the second step is as follows.

The micro control unit activates sensors such as the first ranging component, the image acquisition component, and the second ranging component. Then, the micro control unit controls the rotation component to rapidly rotate and stop at a rotation angle of 0°, and the image acquisition component acquires an image 0. Then, the micro control unit controls the rotation component to slowly rotate and stop at a rotation angle of 60°, and during the rotation, the first ranging component and the second ranging component continuously measure the distance, and the first ranging data and the second ranging data returned from the first ranging component and the second ranging component during the rotation are obtained in real time. The micro control unit simultaneously transmits the obtained data to the main control unit for the main control unit to process, for example, to generate point cloud data using the first ranging data. By repeating the foregoing steps, the image acquisition component acquires an image k at a rotation angle of $(60*k)°$ $(0 \leq k \leq 5)$, and in a period when the rotation component rotates from the rotation angle of $(60*k°)$ to $(60*(k+1)°)$, ranging data is acquired by the first ranging component and the second ranging component. When the rotation component returns to the rotation angle of 0°, the acquisition process ends. The main control unit may verify the data integrity, and check whether the data acquired at this acquisition point is successfully stitched with the existing map. If a failure occurs, the user may be prompted to perform the acquisition again.

The details of the embodiments of the present disclosure are described in detail below through specific embodiments.

Figure 6:
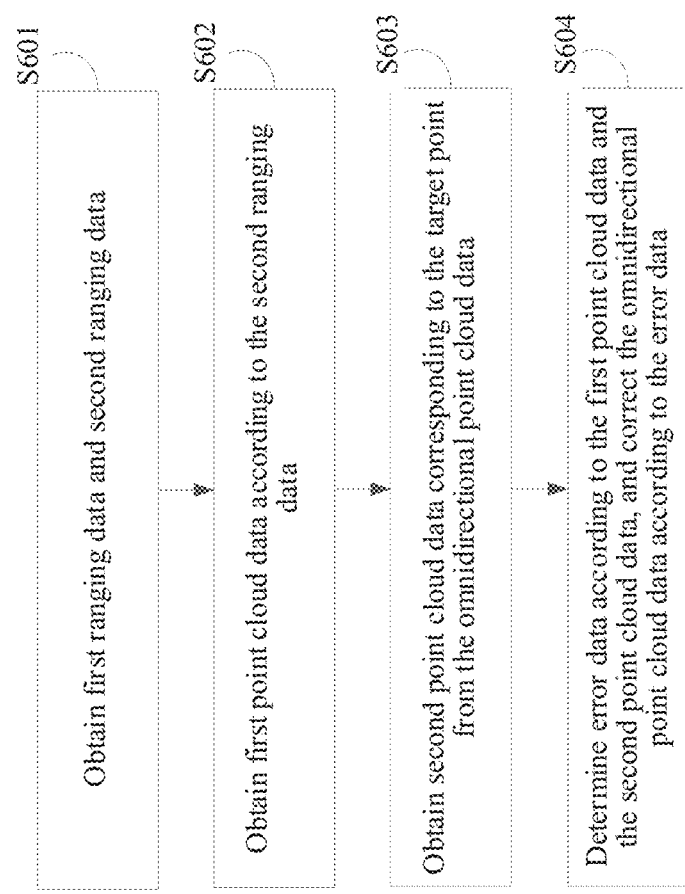
FIG. 6 is a flowchart of a data correction method according to some embodiments of the present disclosure.

FIG. 6 is a flowchart of a data correction method according to some embodiments of the present disclosure. As shown in FIG. 6, the data correction method includes following steps S601, S602, S603, and S604.

In step S601, first ranging data and second ranging data are obtained. The first ranging data and the second ranging data are respectively acquired by the first ranging component and the second ranging component on the foregoing data acquisition device.

In step S602, first point cloud data is obtained according to the second ranging data. The first point cloud data includes three-dimensional spatial coordinates of a target point on an object surface corresponding to the second ranging data.

In step S603, second point cloud data corresponding to the target point is obtained from the omnidirectional point cloud data.

In step S604, error data is determined according to the first point cloud data and the second point cloud data, and the omnidirectional point cloud data is corrected according to the error data.

In this example, for details of the first ranging data and the second ranging data, reference may be made to the description of the data acquisition device in the foregoing embodiments. It is understood that the data correction method may be performed on the main control unit of the data acquisition device, or may be performed on another electronic device. The another electronic device may obtain the first ranging data and the second ranging data from the data acquisition device.

In the process of the data acquisition device rotating for one cycle in the first direction, the second ranging component continuously emits laser beams, and then receives the laser beams reflected by the object surface in the three-dimensional scene, to calculate data of a distance between a point on the object surface to the second ranging component. After the second ranging component rotates for one cycle in the first direction along with the data acquisition device, a set of second ranging data may be measured. The set of second ranging data may include distance data of points on the object surface that is obtained by scanning the three-dimensional scene for one cycle on a horizontal rotation plane by the laser beam emitted by the second ranging component. The points may be referred to as target points. Three-dimensional spatial coordinates of the target points in the global coordinate system may be determined according to the set of second ranging data, and the three-dimensional spatial coordinates may constitute the first point cloud data.

As described above, omnidirectional laser ranging data obtained according to the plurality of sets of first ranging data covers the points on the object surface in the three-dimensional scene in all directions. Therefore, the second point cloud data corresponding to the target points may be extracted from the omnidirectional laser ranging data. That is, the three-dimensional spatial coordinates of the target points are extracted from the omnidirectional laser ranging data to form the second point cloud data.

Since both the first point cloud data and the second point cloud data correspond to the same target points, and the second point cloud data is obtained by the second ranging component with higher precision, the second point cloud data has higher precision. Therefore, the second point cloud data may be used as reference data to calculate an error between the two data. After the error between the first point cloud data and the second point cloud data is calculated, the omnidirectional point cloud data may be corrected by using the error, so that the omnidirectional point cloud data has higher precision. In this way, the high-precision laser ranging module may be used to complement the single-line laser radar, to obtain high-precision point cloud data with a low-cost solution.

The following is an example apparatus of the present disclosure, which may be used for performing the method of the present disclosure.

A data correction apparatus according to some embodiments of the present disclosure is provided. The apparatus may be implemented as a part or the entire of an electronic device by using software, hardware, or a combination thereof. The data correction apparatus includes a first obtaining component, a second obtaining component, an extraction component, and a determining component.

The first obtaining component is configured to obtain first ranging data and second ranging data. The first ranging data and the second ranging data are respectively acquired by the first ranging component and the second ranging component on the foregoing data acquisition device.

The second obtaining component is configured to obtain first point cloud data according to the second ranging data. The first point cloud data includes three-dimensional spatial coordinates of a target point on an object surface corresponding to the second ranging data.

The extraction component is configured to obtain second point cloud data corresponding to the target point from the omnidirectional point cloud data.

The determining component is configured to determine error data according to the first point cloud data and the second point cloud data, and correct the omnidirectional point cloud data according to the error data.

The data correction apparatus corresponds to the data correction method shown in FIG. 5. For specific details, reference may be made to the foregoing description of the data correction method, and thus details are not repeated herein for brevity.

Figure 7:
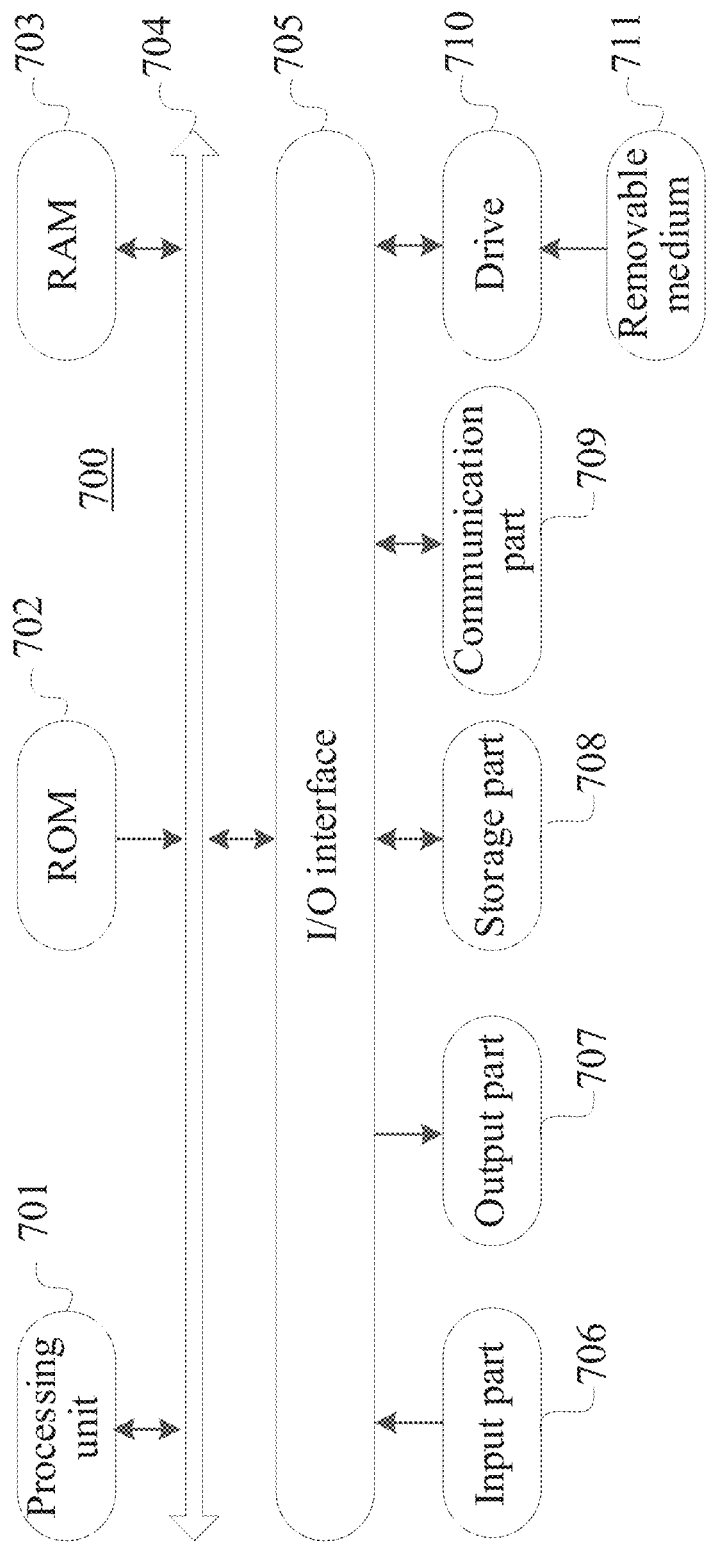
FIG. 7 is a schematic structural diagram of an electronic device configured to implement a data correction method according to some embodiments of the present disclosure.

FIG. 7 is a schematic structural diagram of an electronic device configured to implement a data correction method according to some embodiments of the present disclosure.

As shown in FIG. 7, an electronic device 700 includes a processing unit 701, which may be implemented as a processing unit such as a CPU, a GPU, an FPGA, or an NPU. The processing unit 701 may perform various processing in the implementations of any of the foregoing methods of the present disclosure according to a program stored in a read-only memory (ROM) 702 or a program loaded into a random access memory (RAM) 703 from a storage part 708. In the RAM 703, various programs and data that are required for operations of the electronic device 700 are further stored. The processing unit 701, the ROM 702, and the RAM 703 are connected to each other through a bus 704. An input/output (I/O) interface 705 is also connected to the bus 704.

The following components are connected to the I/O interface 705: an input part 706 including a keyboard, a mouse, and the like; an output part 707 including a cathode ray tube (CRT), a liquid crystal display (LCD), a speaker, and the like; a storage part 708 including hard disk and the like; and a communication part 709 including a network interface card such as an LAN card or a modem. The communication part 709 performs communication processing by using a network such as the Internet. A drive 710 is also connected to the I/O interface 705 as required. A removable medium 711 such as a magnetic disk, an optical disc, a magneto-optical disk, or a semiconductor memory is installed on the drive 710 as required, so that a computer program read from the removable medium is installed into the storage part 708 as required.

In particular, according to the implementations of the present disclosure, any of the foregoing methods with reference to the implementations of the present disclosure may be implemented as a computer software program. For example, some embodiments of the present disclosure include a computer program product, which includes a computer program tangibly included in a readable medium of the computer program product. The computer program includes program code used for performing any of the methods in the implementations of the present disclosure. In such implementation, the computer program may be downloaded and installed from the network through the communication part 709, and/or installed from the removable medium 711.

Flowcharts and block diagrams in the drawings illustrate architectures, functions, and operations that may be implemented by using the system, the method, and the computer program product according to the various implementations of the present disclosure. In this regard, each block in a flowchart or a block diagram may represent a module, a program segment, or a part of code. The module, the program segment, or the part of code includes one or more executable instructions used for implementing specified logic functions. It should be noted that, in some implementations used as substitutes, functions marked in blocks may alternatively occur in a sequence different from that marked in an accompanying drawing. For example, actually two blocks shown in succession may be performed basically in parallel, and sometimes the two blocks may be performed in a reverse sequence. This is determined by a related function. It should be further noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

The units or modules described in the implementations of the present disclosure may be implemented by means of software or hardware. The described units or modules may be alternatively set in a processor. Names of the units or the modules do not constitute a limitation on the units or the modules in a specific case.

In another aspect, the present disclosure further provides a computer-readable storage medium. The computer-readable storage medium may be a computer-readable storage medium included in the apparatus described in the foregoing implementations, or may be a computer-readable storage medium that exists independently and that is not assembled in the device. The computer-readable storage medium stores one or more programs, and one or more processors execute the one or more programs to perform the method described in the present disclosure.

The embodiments may further be described using the following clauses:

1. A data acquisition device, comprising:
    a rotation component configured to drive the data acquisition device to rotate in a first direction;
    a first ranging component configured to rotate in the first direction along with the data acquisition device, rotate in a second direction, and measure first ranging data, the first direction being different from the second direction; and
    an image acquisition component configured to rotate in the first direction along with the data acquisition device and to acquire image data in a three-dimensional scene.

2. The data acquisition device of clause 1, wherein the first direction and the second direction are perpendicular to each other.

3. The data acquisition device of clause 1, further comprising:
    a second ranging component configured to obtain second ranging data, wherein a ranging error of the second ranging component is less than a ranging error of the first ranging component.

4. The data acquisition device of clause 3, wherein in a process of the rotation component driving the data acquisition device to rotate for one rotation in the first direction, the second ranging component rotates in the first direction to measure the second ranging data.

5. The data acquisition device of clause 3, wherein the rotation component is arranged below the data acquisition device, the first ranging component is arranged on a first side of the data acquisition device, the second ranging component is arranged on a second side of the data acquisition device, and a plane on which the first side is located intersects with a plane on which the second side is located, a lens direction of the image acquisition component being opposite to a ranging direction of the second ranging component.

6. The data acquisition device of clause 5, wherein the first ranging component is a single-line laser radar.

7. The data acquisition device of clause 3, further comprising:
    a micro control unit connected to the rotation component, the first ranging component, and the second ranging component, and is configured to control the rotation component and obtain a rotation angle of the rotation component, the first ranging data, and the second ranging data in real time; and
    a main control unit connected to the image acquisition component, and is configured to obtain the image data from the image acquisition component and process the rotation angle, the first ranging data, and the second ranging data received from the micro control unit according to the first ranging data;
    wherein the micro control unit is further configured to perform time synchronization on the rotation angle, the first ranging data, and the second ranging data that are obtained, and then output the rotation angle, the first ranging data, and the second ranging data to the main control unit.

8. The data acquisition device of clause 7, wherein the main control unit is configured to obtain omnidirectional point cloud data in the three-dimensional scene by processing a plurality of sets of the first ranging data, the omnidirectional point cloud data comprises three-dimensional spatial coordinates of a measured point on an object surface in the three-dimensional scene, and the plurality of sets of the first ranging data comprise data acquired by the first ranging component by rotating for one cycle in the first direction along with the data acquisition device and rotating for a plurality of cycles in the second direction.

9. The data acquisition device of clause 8, wherein the main control unit is further configured to process the omnidirectional point cloud data and the image data, to obtain a three-dimensional scene model.

10. The data acquisition device of clause 7, wherein the main control unit is further configured to perform error correction on the omnidirectional point cloud data by using the second ranging data, by performing:
    obtaining first point cloud data according to the second ranging data, wherein the first point cloud data comprises three-dimensional spatial coordinates of a target point on an object surface corresponding to the second ranging data;
    obtaining second point cloud data corresponding to the target point from the omnidirectional point cloud data;
    determining error data according to the first point cloud data and the second point cloud data; and
    correcting the omnidirectional point cloud data according to the error data.

11. The data acquisition device of clause 7, wherein the main control unit is further configured to process the image data to obtain a corresponding panoramic image.

12. The data acquisition device of clause 1, wherein the first ranging component and the second ranging component are both laser ranging components.

13. The data acquisition device of clause 1, wherein a lens center of the image acquisition component is located on a line extending from a rotation axis of the rotation component.

14. The data acquisition device of clause 1, wherein the image acquisition component acquires the image data after rotating to a preset rotation angle in the first direction.

15. A data correction apparatus, comprising:
- a first obtaining component, configured to obtain first ranging data and second ranging data, wherein the first ranging data and the second ranging data are respectively acquired by a first ranging component and a second ranging component on a data acquisition device;
- a second obtaining component, configured to obtain first point cloud data according to the second ranging data, wherein the first point cloud data comprises three-dimensional spatial coordinates of a target point on an object surface corresponding to the second ranging data;
- an extraction component, configured to obtain second point cloud data corresponding to the target point from the omnidirectional point cloud data; and
- a determining component, configured to determine error data according to the first point cloud data and the second point cloud data, and correct the omnidirectional point cloud data according to the error data.

16. The data correction apparatus of clause 15, wherein the data acquisition device comprises:
- a rotation component configured to drive the data acquisition device to rotate in a first direction;
- an image acquisition component configured to rotate in the first direction along with the data acquisition device and acquire image data in a three-dimensional scene; wherein:
- the first ranging component is configured to rotate in the first direction along with the data acquisition device, rotate in a second direction, and measure first ranging data, the first direction being different from the second direction; and the second ranging component is configured to obtain second ranging data, wherein a ranging error of the second ranging component is less than a ranging error of the first ranging component.

17. The data correction apparatus of clause 16, wherein in a process of the rotation component driving the data acquisition device to rotate for one rotation in the first direction, the second ranging component rotates in the first direction to measure the second ranging data.

18. The data correction apparatus of clause 16, wherein the rotation component is arranged below the data acquisition device, the first ranging component is arranged on a first side of the data acquisition device, the second ranging component is arranged on a second side of the data acquisition device, and a plane on which the first side is located intersects with a plane on which the second side is located, a lens direction of the image acquisition component being opposite to a ranging direction of the second ranging component.

19. The data correction apparatus of clause 16, wherein the data acquisition device further comprises:
- a micro control unit connected to the rotation component, the first ranging component, and the second ranging component, and is configured to control the rotation component and obtain a rotation angle of the rotation component, the first ranging data, and the second ranging data in real time; and
- a main control unit connected to the image acquisition component, and is configured to obtain the image data from the image acquisition component and process the rotation angle, the first ranging data, and the second ranging data received from the micro control unit according to the first ranging data;
- wherein the micro control unit is further configured to perform time synchronization on the rotation angle, the first ranging data, and the second ranging data that are obtained, and then output the rotation angle, the first ranging data, and the second ranging data to the main control unit.

20. A data correction method, comprising:
- obtaining first ranging data and second ranging data, wherein the first ranging data and the second ranging data are respectively acquired by the first ranging component and the second ranging component on a data acquisition device;
- obtaining first point cloud data according to the second ranging data, wherein the first point cloud data comprises three-dimensional spatial coordinates of a target point on an object surface corresponding to the second ranging data;
- obtaining second point cloud data corresponding to the target point from the omnidirectional point cloud data; and
- determining error data according to the first point cloud data and the second point cloud data, and correcting the omnidirectional point cloud data according to the error data.

21. An electronic device, comprising:
- a memory configured to store one or more computer instructions; and
- one or more processors, wherein the one or more computer instructions are executed by the one or more processors to cause the electron device to perform:
  - obtaining first ranging data and second ranging data, wherein the first ranging data and the second ranging data are respectively acquired by a first ranging component and a second ranging component on a data acquisition device;
  - obtaining first point cloud data according to the second ranging data, wherein the first point cloud data comprises three-dimensional spatial coordinates of a target point on an object surface corresponding to the second ranging data;
  - obtaining second point cloud data corresponding to the target point from the omnidirectional point cloud data; and
  - determining error data according to the first point cloud data and the second point cloud data, and correcting the omnidirectional point cloud data according to the error data.

22. A non-transitory computer-readable storage medium that stores one or more programs executable by one or more processors to cause a device to perform:
- obtaining first ranging data and second ranging data, wherein the first ranging data and the second ranging data are respectively acquired by the first ranging component and the second ranging component on a data acquisition device;
- obtaining first point cloud data according to the second ranging data, wherein the first point cloud data comprises three-dimensional spatial coordinates of a target point on an object surface corresponding to the second ranging data;
- obtaining second point cloud data corresponding to the target point from the omnidirectional point cloud data; and determining error data according to the first point cloud data and the second point cloud data, and correcting the omnidirectional point cloud data according to the error data.

The foregoing descriptions are merely preferred embodiments of the present disclosure and descriptions of the technical principles used. A person skilled in the art should understand that the scope of the present disclosure is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in the present disclosure (but not limited thereto) are also included.

What is claimed is:

1. A data acquisition device, comprising:
   a rotation component configured to drive the data acquisition device to rotate in a first direction;
   a first ranging component configured to rotate in the first direction along with the data acquisition device, rotate in a second direction, and measure first ranging data, the first direction being different from the second direction;
   an image acquisition component configured to rotate in the first direction along with the data acquisition device and to acquire image data in a three-dimensional scene; and
   a second ranging component configured to obtain second ranging data, wherein a lens direction of the image acquisition component being opposite to a ranging direction of the second ranging component,
   wherein the first ranging component is arranged on a first side of the data acquisition device, the second ranging component is arranged on a second side of the data acquisition device, and a plane on which the first side is located intersects with a plane on which the second side is located.

2. The data acquisition device of claim 1, wherein the first direction and the second direction are perpendicular to each other.

3. The data acquisition device of claim 1, wherein a ranging error of the second ranging component is less than a ranging error of the first ranging component.

4. The data acquisition device of claim 1, wherein in a process of the rotation component driving the data acquisition device to rotate for one rotation in the first direction, the second ranging component rotates in the first direction to measure the second ranging data.

5. The data acquisition device of claim 1, wherein the rotation component is arranged below the data acquisition device.

6. The data acquisition device of claim 5, wherein the first ranging component is a single-line laser radar.

7. The data acquisition device of claim 1, further comprising:
   a micro control unit connected to the rotation component, the first ranging component, and the second ranging component, and is configured to control the rotation component and obtain a rotation angle of the rotation component, the first ranging data, and the second ranging data in real time; and
   a main control unit connected to the image acquisition component, and is configured to obtain the image data from the image acquisition component and process the rotation angle, the first ranging data, and the second ranging data received from the micro control unit according to the first ranging data;
   wherein the micro control unit is further configured to perform time synchronization on the rotation angle, the first ranging data, and the second ranging data that are obtained, and then output the rotation angle, the first ranging data, and the second ranging data to the main control unit.

8. The data acquisition device of claim 7, wherein the main control unit is configured to obtain omnidirectional point cloud data in the three-dimensional scene by processing a plurality of sets of the first ranging data, the omnidirectional point cloud data comprises three-dimensional spatial coordinates of a measured point on an object surface in the three-dimensional scene, and the plurality of sets of the first ranging data comprise data acquired by the first ranging component by rotating for one cycle in the first direction along with the data acquisition device and rotating for a plurality of cycles in the second direction.

9. The data acquisition device of claim 8, wherein the main control unit is further configured to process the omnidirectional point cloud data and the image data, to obtain a three-dimensional scene model.

10. The data acquisition device of claim 8, wherein the main control unit is further configured to perform error correction on the omnidirectional point cloud data by using the second ranging data, by performing:
    obtaining first point cloud data according to the second ranging data, wherein the first point cloud data comprises three-dimensional spatial coordinates of a target point on an object surface corresponding to the second ranging data;
    obtaining second point cloud data corresponding to the target point from the omnidirectional point cloud data;
    determining error data according to the first point cloud data and the second point cloud data; and
    correcting the omnidirectional point cloud data according to the error data.

11. The data acquisition device of claim 7, wherein the main control unit is further configured to process the image data to obtain a corresponding panoramic image.

12. The data acquisition device of claim 1, wherein the first ranging component and the second ranging component are both laser ranging components.

13. The data acquisition device of claim 1, wherein a lens center of the image acquisition component is located on a line extending from a rotation axis of the rotation component.

14. The data acquisition device of claim 1, wherein the image acquisition component acquires the image data after rotating to a preset rotation angle in the first direction.

15. A data correction apparatus, comprising:
    a first obtaining component, configured to obtain first ranging data and second ranging data, wherein the first ranging data and the second ranging data are respectively acquired by a first ranging component and a second ranging component on a data acquisition device, a lens direction of an image acquisition component of the data acquisition device being opposite to a ranging direction of the second ranging component, the image acquisition component being configured to rotate in a first direction along with the data acquisition device and acquire image data in a three-dimensional scene;
    a second obtaining component, configured to obtain first point cloud data according to the second ranging data, wherein the first point cloud data comprises three-dimensional spatial coordinates of a target point on an object surface corresponding to the second ranging data;

an extraction component, configured to obtain second point cloud data corresponding to the target point from omnidirectional point cloud data; and a determining component, configured to determine error data according to the first point cloud data and the second point cloud data, and correct the omnidirectional point cloud data according to the error data, wherein the first ranging component is arranged on a first side of the data acquisition device, the second ranging component is arranged on a second side of the data acquisition device, and a plane on which the first side is located intersects with a plane on which the second side is located.

16. The data correction apparatus of claim 15, wherein the data acquisition device comprises:

a rotation component configured to drive the data acquisition device to rotate in the first direction;

wherein:

the first ranging component is configured to rotate in the first direction along with the data acquisition device, rotate in a second direction, and measure first ranging data, the first direction being different from the second direction; and the second ranging component is configured to obtain second ranging data, wherein a ranging error of the second ranging component is less than a ranging error of the first ranging component.

17. The data correction apparatus of claim 16, wherein in a process of the rotation component driving the data acquisition device to rotate for one rotation in the first direction, the second ranging component rotates in the first direction to measure the second ranging data.

18. The data correction apparatus of claim 16, wherein the rotation component is arranged below the data acquisition device.

19. The data correction apparatus of claim 16, wherein the data acquisition device further comprises:

a micro control unit connected to the rotation component, the first ranging component, and the second ranging component, and is configured to control the rotation component and obtain a rotation angle of the rotation component, the first ranging data, and the second ranging data in real time; and a main control unit connected to the image acquisition component, and is configured to obtain the image data from the image acquisition component and process the rotation angle, the first ranging data, and the second ranging data received from the micro control unit according to the first ranging data;

wherein the micro control unit is further configured to perform time synchronization on the rotation angle, the first ranging data, and the second ranging data that are obtained, and then output the rotation angle, the first ranging data, and the second ranging data to the main control unit.

20. A non-transitory computer-readable storage medium that stores one or more programs executable by one or more processors to cause a device to perform:

obtaining first ranging data and second ranging data, wherein the first ranging data and the second ranging data are respectively acquired by a first ranging component and a second ranging component on a data acquisition device, a lens direction of an image acquisition component of the data acquisition device being opposite to a ranging direction of the second ranging component, the image acquisition component being configured to rotate in a first direction along with the data acquisition device and acquire image data in a three-dimensional scene, the first ranging component being arranged on a first side of the data acquisition device, the second ranging component being arranged on a second side of the data acquisition device, and a plane on which the first side is located intersecting with a plane on which the second side is located;

obtaining first point cloud data according to the second ranging data, wherein the first point cloud data comprises three-dimensional spatial coordinates of a target point on an object surface corresponding to the second ranging data;

obtaining second point cloud data corresponding to the target point from omnidirectional point cloud data; and determining error data according to the first point cloud data and the second point cloud data, and correcting the omnidirectional point cloud data according to the error data.

* * * * *